United States Patent
Rasinski et al.

(10) Patent No.: US 6,404,082 B1
(45) Date of Patent: Jun. 11, 2002

(54) EXCITER HAVING THERMALLY ISOLATED DIODE WHEEL AND METHOD OF REMOVING DIODE WHEEL FOR SAME

(75) Inventors: Michael Joseph Rasinski, Winter Springs, FL (US); Barry Mathewson, Irwin; William Francis Hannan, Monroeville, both of PA (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 0 days.

(21) Appl. No.: 09/405,497

(22) Filed: Sep. 24, 1999

(51) Int. Cl.$^7$ .................................................. H02K 9/00
(52) U.S. Cl. ..................................... 310/52; 310/68 D
(58) Field of Search .............................. 310/52, 68 D, 310/44, 45, 68 R; 363/145, 144

(56) References Cited

U.S. PATENT DOCUMENTS

| | | |
|---|---|---|
| 3,368,091 A | 2/1968 | Layman |
| 3,371,235 A | 2/1968 | Hoover |
| 3,590,291 A | 6/1971 | Spisak et al. |
| 3,686,523 A | 8/1972 | Gordon et al. |
| 3,723,794 A | 3/1973 | Spisak et al. |
| 3,845,369 A * | 10/1974 | Heyne, III ................. 318/174 |
| 3,852,628 A | 12/1974 | Spisak et al. |
| 3,872,335 A | 3/1975 | Peterson et al. |
| 4,007,389 A | 2/1977 | Kuter |
| 4,029,981 A | 6/1977 | Kuter et al. |
| 4,052,629 A | 10/1977 | Kuter et al. |
| 4,052,631 A | 10/1977 | Kuter |
| 4,079,276 A | 3/1978 | Kuter |
| 4,456,843 A | 6/1984 | Heyne et al. |
| 4,508,583 A | 4/1985 | Beavers et al. |
| 5,646,838 A * | 7/1997 | Keidar et al. ................. 363/145 |
| 5,712,517 A * | 1/1998 | Schmidt et al. ................. 310/45 |
| 5,812,388 A * | 9/1998 | Keidar et al. ................. 363/145 |
| 5,825,108 A * | 10/1998 | De Filippis ................. 310/67 R |

FOREIGN PATENT DOCUMENTS

EP 56025359 3/1981

* cited by examiner

Primary Examiner—Nestor Ramirez
Assistant Examiner—Thanh Lam

(57) ABSTRACT

An exciter (20) for starting a power generator having a thermally isolated diode wheel (25) and methods of removing a diode wheel (25) from an exciter rotor shaft (30) are provided. The exciter (20) preferably includes an exciter rotor shaft (30), a thermal insulation layer (40) mounted to the exciter shaft (30), and a diode wheel (25) having a wheel hub (26). The wheel hub (26) of the diode wheel (25) is preferably mounted by an interference fit to overlie and abuttingly contact the thermal insulation layer (40) positioned on the exciter rotor shaft (30). The thermal insulation layer (40) is positioned on the exciter rotor shaft (30) and between the shaft (30) and the diode wheel (25) in a location where electrical insulation is not necessary. A method of removing a diode wheel (25) mounted by an interference fit to an exciter rotor shaft (30) of an exciter (20) preferably includes heating a diode wheel (25) positioned on an exciter rotor shaft (30) having a thermal insulation layer (40) positioned thereon to a desired temperature which enhances removal of the diode wheel (25) from the shaft (30), quenching the exciter rotor shaft (30) with a liquid coolant at a temperature less than air ambient temperature, delaying the heat transfer from the diode wheel (25) to the exciter rotor shaft (30) during the quenching of the exciter rotor shaft (30) by the thermal insulation layer (40), and applying a force to the diode wheel (25) to thereby remove the diode wheel (25) from the shaft (30).

7 Claims, 4 Drawing Sheets

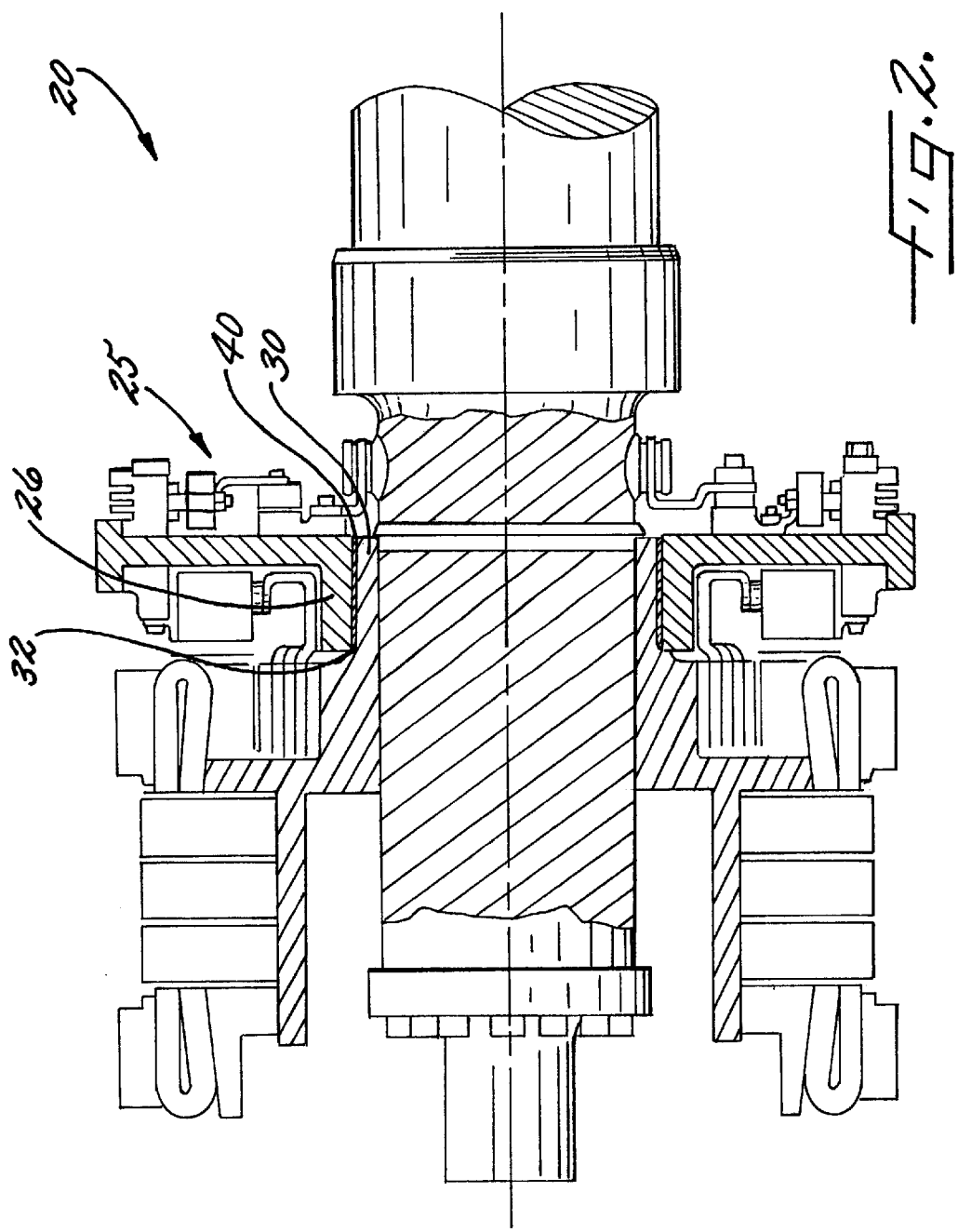

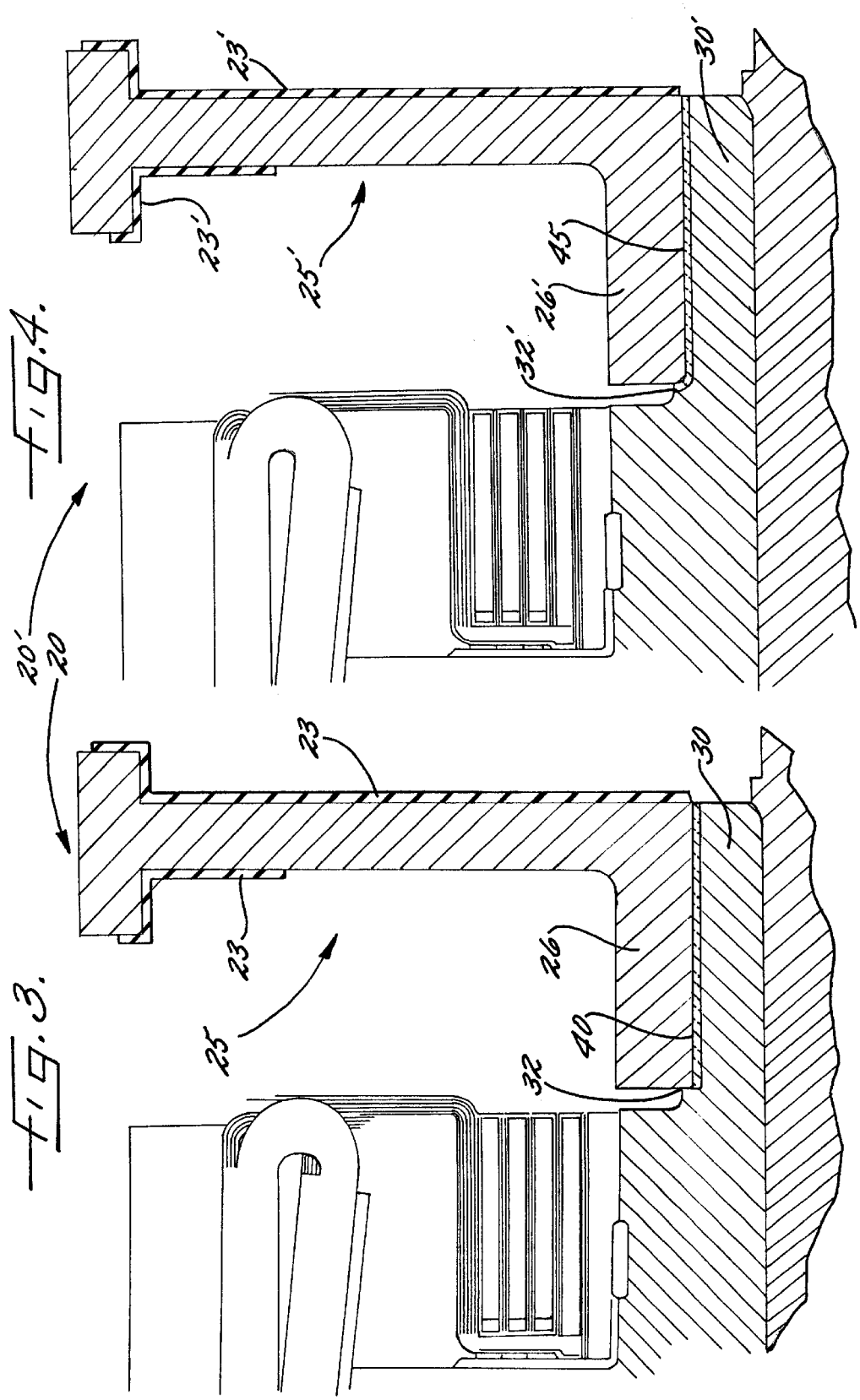

EXCITER HAVING THERMALLY ISOLATED DIODE WHEEL AND METHOD OF REMOVING DIODE WHEEL FOR SAME

FIELD OF THE INVENTION

This invention is related to the power generation industry and, more particularly, to the field of brushless exciters for power generators.

BACKGROUND OF THE INVENTION

In the power generation industry, it is well understood by those skilled in the art that an exciter, e.g., a brushless exciter, is often used to start a power generator. As shown in the prior art of FIG. 1, a conventional brushless exciter 10 includes a diode wheel 12 having a wheel hub 14 thereof which is mounted to an exciter rotor shaft 15. The diode wheel 12 also has portions 13 thereof which are electrically insulated as illustrated. The diode wheel 12 has a heavy interference fit with the shaft 15 and a notch or positive stop 16 thereof when the wheel 12 is positioned on the shaft 15. Removal of the diode wheel 12 from the shaft 15, however, can be time consuming, difficult, and costly and can damage the windings, parallel rings, the shaft 15, the diode wheel 12 or other portions of the exciter in the process. Because of friction and heating during operation and the interference fit of the diode wheel 12 with the shaft 15, the metal materials of the shaft 15 and the wheel hub 14 of the diode wheel 12, e.g., both formed of forged alloy steel, tend to be held or bond together, especially with the heavy interference fit. Because of the heavy interference fit, enough temperature difference must be obtained between the diode wheel 12 and the exciter rotor shaft 15 to enable disassembly of the wheel 12 from the shaft 15. For example, the wheel 12 can be removed with high temperature heating to attempt to obtain the desired temperature differential, rapid quenching of the inside diameter of the wheel 12, and use of a high tonnage jack. Because of the thin construction of the rotor shaft 15, however, it is difficult to obtain the desired temperature differential without damage to various portions of the exciter 10 as described above.

SUMMARY OF THE INVENTION

In view of the foregoing, the present invention advantageously provides a thermally insulated diode wheel for a brushless exciter and methods of removing the diode wheel which substantially reduces any potential damage to various portions of the exciter. The present invention also advantageously provides a thermally insulated diode wheel for a brushless exciter and methods of removing the diode wheel which impedes heat transfer from a diode wheel mounted on an exciter rotor shaft. The present invention further advantageously provides a thermally insulated diode wheel for a brushless exciter and methods of removing the diode wheel which allows the diode wheel to be removed quicker, less costly, and without the necessity of having to use special machinery to remove the diode wheel from the exciter rotor shaft.

More particularly, the present invention provides an exciter which preferably includes an exciter rotor shaft, a thermal insulation layer mounted to the exciter shaft, and a diode wheel having a wheel hub. The wheel hub of the diode wheel is preferably mounted by an interference fit to overlie and abuttingly contact the thermal insulation layer positioned on the exciter rotor shaft. The thermal insulation layer is positioned on the exciter rotor shaft and between the shaft and the diode wheel in a location where electrical insulation is not necessary.

The present invention also provides a method of removing a diode wheel mounted by an interference fit to an exciter rotor shaft of an exciter. The method preferably includes heating a diode wheel positioned on an exciter rotor shaft having a thermal insulation layer positioned thereon to a desired temperature which enhances removal of the diode wheel from the shaft, quenching the exciter rotor shaft with a liquid coolant at a temperature less than air ambient temperature, delaying the heat transfer from the diode wheel to the exciter rotor shaft during the quenching of the exciter rotor shaft by the thermal insulation layer, and applying a force to the diode wheel to thereby remove the diode wheel from the shaft.

The present invention further provides a method of removing a diode wheel mounted by an interference fit to an exciter rotor shaft of a brushless exciter. The method preferably includes heating a diode wheel positioned on an exciter rotor shaft to a predetermined temperature which is less than a temperature which would otherwise substantially damage portions of the brushless exciter, delaying the heat transfer from the diode wheel to the exciter rotor shaft, and applying a force to the diode wheel to thereby remove the diode wheel from the shaft.

The exciter having a thermally insulated diode wheel and methods of removing a diode wheel from an exciter rotor shaft advantageously are particularly used in portions of exciters where there is no necessity to electrically isolate the wheel from the shaft. In other words, the problem discovered and addressed by the present invention is a need for thermal isolation. Also, the exciter having a thermally insulated diode wheel and methods of removing a diode wheel provide the benefits of being able to handle high compressive loads and yet still maintain a minimum interference fit of the wheel with the shaft during overspeed conditions.

BRIEF DESCRIPTION OF THE DRAWINGS

Some of the features, advantages, and benefits of the present invention having been stated, others will become apparent as the description proceeds when taken in conjunction with the accompanying drawings in which:

FIG. 2 is a fragmentary side elevational view of an exciter having a thermally isolated diode wheel mounted to an exciters rotor shaft according to a first embodiment of the present invention;

FIG. 3 is a partial sectional view of a thermally isolated diode wheel mounted to an exciter rotor shaft according to a first embodiment of the present invention;

FIG. 4 is a partial sectional view of a thermally isolated diode wheel mounted to an exciter rotor shaft according to a second embodiment of the present invention;

DETAILED DESCRIPTION OF PREFERRED EMBODIMENTS

Figure 1:
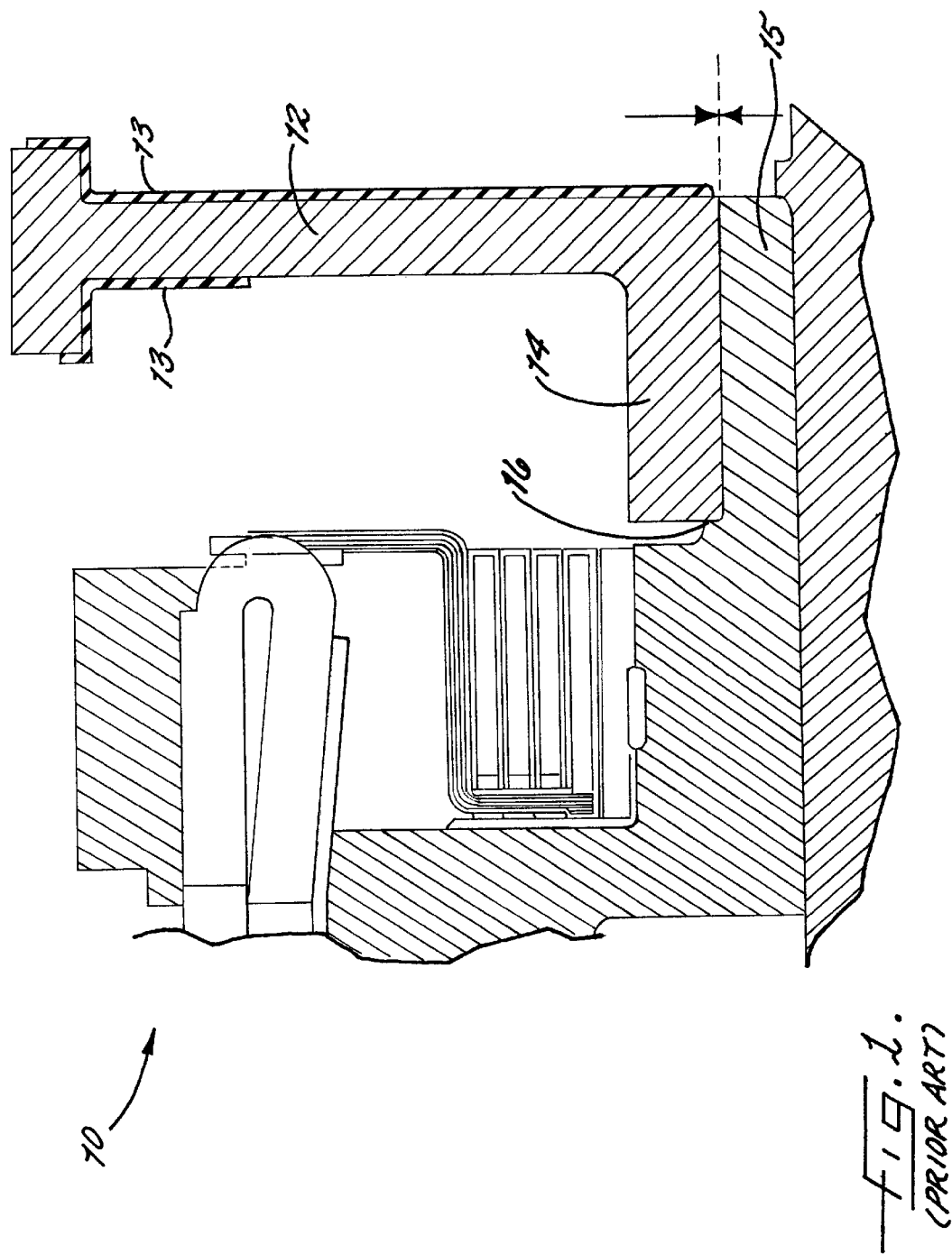
FIG. 1 is a sectional view of a portion of an exciter having a diode wheel according to the prior art.

The present invention will now be described more fully hereinafter with reference to the accompanying drawings, in which preferred embodiments of the invention are shown.

This invention may, however, be embodied in many different forms and should not be construed as limited to the illustrated embodiments set forth herein. Rather, these illustrated embodiments are provided so that this disclosure will be thorough and complete, and will fully convey the scope of the invention to those skilled in the art. Like numbers refer to like elements throughout, and prime and double prime notation, if used, indicate similar elements in alternative embodiments.

FIG. 2 illustrates an exciter 20 having a diode wheel mounted to an exciter rotor shaft 30 which is thermally insulated from the diode wheel 25 according to the present invention. As perhaps best shown in FIGS. 2–3, the exciter 20, e.g., preferably a brushless exciter, includes an exciter rotor shaft 30, a thermal insulation layer 40 mounted to the exciter shaft 30, and a diode wheel 25 having a wheel hub 26. The shaft 30 and the wheel hub 26 are preferably formed of a metal material such as forged alloy steel. Because of the thin construction of the shaft 30, as understood by those skilled in the art, without the present invention it is difficult or impossible to obtain a desired differential temperature to remove the diode wheel 25 without damage to the exciter windings, parallel rings, or other portions of the exciter 20 as understood by those skilled in the art. The wheel hub 26 of the diode wheel 25 is preferably mounted by an interference fit on the shaft 30 and preferably to overlie and abuttingly contact the thermal insulation layer 40 positioned on the exciter rotor shaft 30. The thermal insulation layer 40 is positioned on the exciter rotor shaft 30 and preferably between the shaft 30 and the diode wheel 25 in a location where electrical insulation is not necessary. Notably, other portions 23 of the exciter 20, and particularly the diode wheel 25, include electrical insulation material.

The thermal insulation layer 40, for example, can be provided by a glass material and can advantageously be bonded to and is positioned to surround at least a portion of the rotor shaft 30 to which the wheel hub 26 is mounted by the interference fit. As shown in an alternate embodiment of FIG. 4, the rotor shaft 30' can also advantageously include a positive stop member 32', e.g., a notch or shoulder, and the diode wheel 25' of the exciter 20' is positioned to abuttingly contact the positive stop member 32'. The thermal insulation layer 45 preferably also overlies at least portions of the positive stop member 32' against which the wheel hub 26' abuttingly contacts.

Additionally, the thermal insulation layer 40 which includes a glass material is preferably able to withstand high compressive loads. The thermal insulation layer 40 preferably has a minimum compressive yield strength so that pressure from the diode wheel 25 on the thermal insulation layer 40 is below the minimum compressive yield strength of the thermal insulation layer 40 and the interference fit is at least at a minimum interference to maintain the diode wheel 25 in contact with the exciter rotor shaft 30 during operation of the exciter 20 in predetermined maximum overspeed conditions. The predetermined maximum overspeed conditions preferably are within a range of 15 to 25 percent, e.g., 20 percent, of a rated operating speed for the exciter rotor shaft 30.

As illustrated in FIGS. 2–6, the present invention also provides a method of removing a diode wheel 25 mounted by an interference fit to an exciter rotor shaft 30 of an exciter 20. As perhaps best illustrated in FIG. 6, a method 50 can advantageously include heating 51 a diode wheel 25, e.g., formed of forged alloy steel, positioned on, e.g., shrunk over, an exciter rotor shaft 30, e.g., also formed of forged alloy steel, having a thermal insulation layer 40 positioned thereon to a desired temperature which enhances removal of the diode wheel 25 from the shaft 30. For example, in many applications, the temperature is obtained at which the other portions or components experience a lower temperature, preferably less than 150 degrees Celsius, so as to prevent damage to these other portions or components of the exciter 20. The exciter rotor shaft 30 can also advantageously include a positive stop member 32, e.g., a notch or shoulder, for stopping the wheel hub 26 from extending further on the shaft 30, and the thermal insulation layer 45 (see FIG. 4) also overlies at least portions of the positive stop member 32' against which the wheel hub 26' abuttingly contacts.

One of the purposes or objects of the present invention related to the method of diode wheel removal is to heat the diode wheel 25 to the desired or required temperature to get enough expansion for removal. The rotor shaft 30 does not need to be heated. Because the diode wheel 25 is positioned on the shaft 30, however, the shaft will get heated as well. Also, the methods of heating can impact how much the shaft is heated. With the use of the thermal insulation layer 45, the remaining exciter components are protected and can be instrumented to monitor their temperature which should be limited to 150 degrees Celsius. The diode wheel 25 can be heated to as high a temperature as possible without having the other exciter components exceed the 150 degrees Celsius. The diode wheel 25 does not need to be limited to 150 degrees Celsius, and it may be desirable to heat the diode wheel 25 as hot as possible for disassembly.

The method also includes quenching, e.g., cooling 52, the exciter rotor shaft 30 with a liquid coolant at a temperature less than air ambient temperature. The liquid coolant is preferably water, but other coolants known to those skilled in the art can be used as well. The method additionally includes delaying the heat transfer from the diode wheel 25 to the exciter rotor shaft 30 preferably during the quenching or cooling 52 of the exciter rotor shaft 30 by the thermal insulation layer 40 and applying a force or pressure 53 to the diode wheel 25 to thereby remove or free 54 the diode wheel 25 from the shaft 30. The force or pressure, for example, can be provided by an hydraulic jack or other tools, understood by those skilled in the art, having enough force or pressure removal capability for removing a diode wheel 25.

The method also can include the thermal insulation layer 40 being positioned on the shaft 30 by applying a layer 40 of thermal insulating material, e.g., a glass material, on the shaft 30 over a preselected wheel hub fit portion, bonding the thermal insulating material to the shaft 30, curing the material under a preselected pressure, and forming, e.g., machining such as grinding, polishing, trimming, etc., the cured material to a desired interference fit with an inside diameter of the wheel hub 26. The thermal insulation layer 40 should be selected to have a minimum compressive yield strength so that pressure from the diode wheel 25 on the thermal insulation layer 40 is below the minimum compressive yield strength of the thermal insulation layer 40 and the interference fit is at least at a minimum interference to maintain the diode wheel 25 in contact with the shaft 30 during operation of the exciter 20 in predetermined maximum overspeed conditions. As described above, the predetermined maximum overspeed conditions are preferably in the range of about 15 to about 25 percent, e.g., 20 percent, above a predetermined rated speed for the exciter rotor shaft 30 on the exciter 20.

Figure 5:
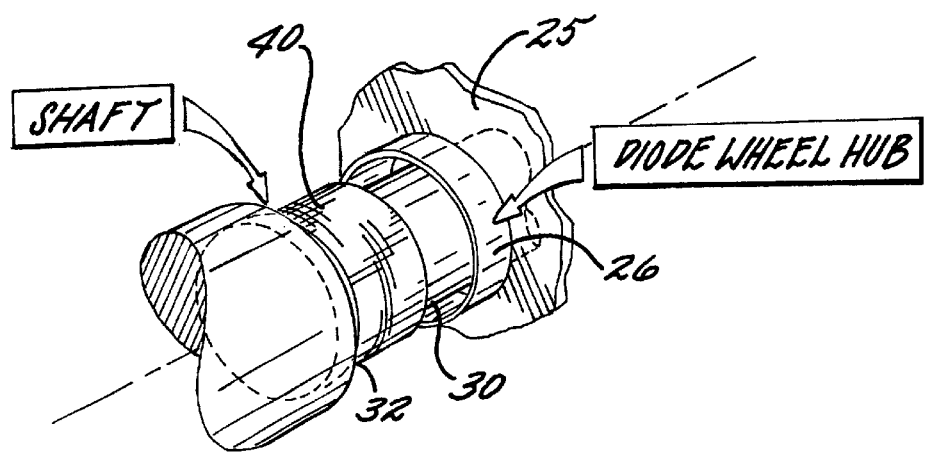
FIG. 5 is a fragmentary perspective view of a wheel hub of a diode wheel being removed from an exciter rotor shaft having a thermal insulation layer positioned thereon according to the present invention.
Figure 6:
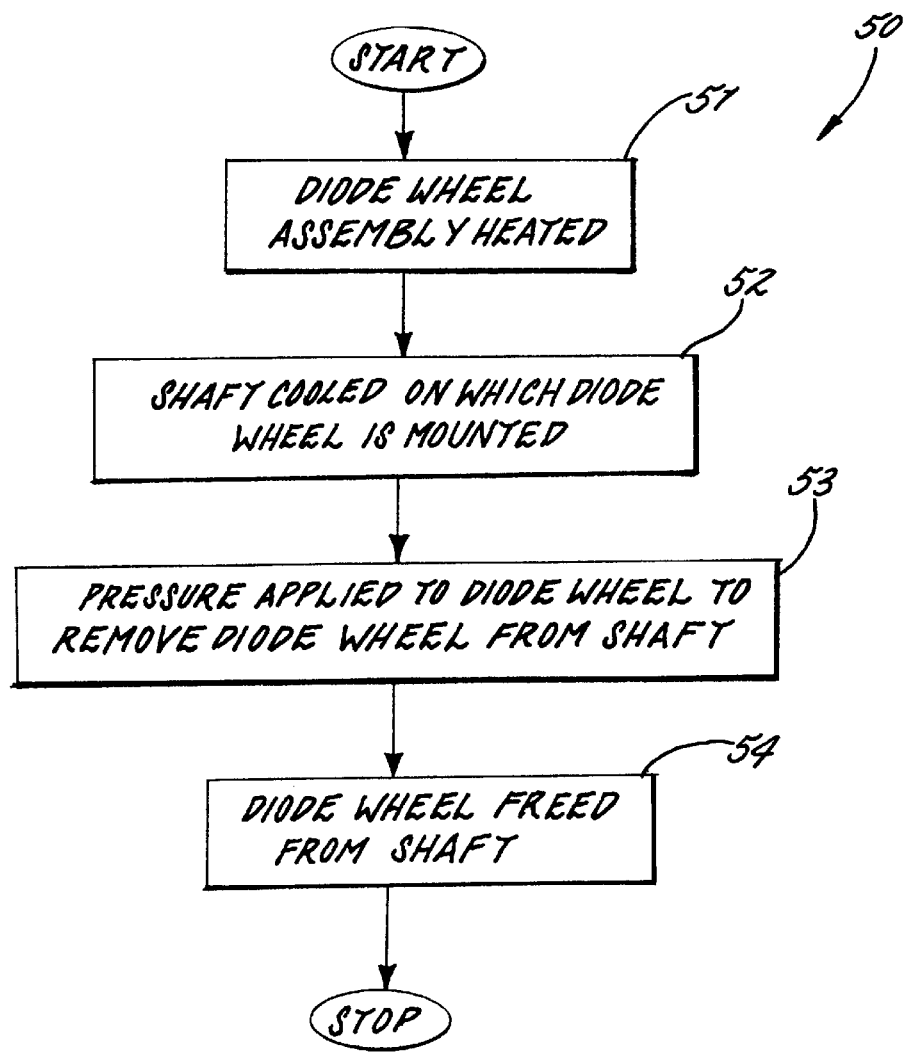
FIG. 6 is a schematic flow diagram of a method of removing a diode wheel on an exciter according to the present invention.

Alternatively, for example, the present invention can also provide a method of removing a diode wheel 25 mounted by an interference fit to an exciter rotor shaft 30 of a brushless exciter 20 (as perhaps best shown in FIGS. 5–6). The method preferably includes heating a diode wheel 25 positioned on, e.g., shrunk over, an exciter rotor shaft 30 to a predetermined temperature which is less than a temperature which would otherwise substantially damage portions of the brushless exciter 20 and delaying the heat transfer from the diode wheel 25 to the exciter rotor shaft 30 (preferably through the use of a thermal insulation layer 40). The method can also include quenching an exciter rotor shaft and applying a force to the diode wheel 25 to thereby remove the diode wheel 25 from the shaft 30. Other methods and features as described above can also be included with this method.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

What is claimed is:

1. An exciter for starting a power generator, the exciting comprising:

an exciter rotor shaft;

a thermal insulation layer mounted to the exciter shaft; and a diode wheel having a wheel hub, the wheel hub of the diode wheel being mounted by an interference fit to overlie and abuttingly contact the thermal insulation layer positioned on the exciter rotor shaft, and wherein the thermal insulation layer is positioned on the exciter rotor shaft and between the shaft and the diode wheel in a location where electrical insulation is not necessary, wherein the thermal insulation layer has a minimum compressive yield strength, and wherein pressure from the diode wheel on the thermal insulation layer is below the minimum compressive yield strength of the thermal insulation layer and the interference fit is at least at a minimum interference to maintain the diode wheel in contact with the exciter rotor shaft during operation of the exciter in predetermined maximum overspeed conditions.

2. An exciter as defined in claim 1, wherein the predetermined maximum overspeed conditions are within a range of 15 to 25 percent above a rated operating speed for the exciter rotor shaft.

3. An exciter for starting a power generator, the exciting comprising:

an exciter rotor shaft having a positive stop member;

a thermal insulation layer mounted to the exciter shaft; and a diode wheel having a wheel hub, the wheel hub of the diode wheel being mounted by an interference fit to overlie and abuttingly contact at least a portion of the thermal insulation layer positioned on the exciter rotor shaft, wherein the thermal insulation layer is positioned on the exciter rotor shaft and between the shaft and the diode wheel in a location where electrical insulation is not necessary, and wherein the diode wheel is positioned to abuttingly contact the positive stop member on the rotor shaft, wherein the thermal insulation layer has a minimum compressive yield strength, and wherein pressure from the diode wheel on the thermal insulation layer is below the minimum compressive yield strength of the thermal insulation layer and the interference fit is at least at a minimum interference to maintain the diode wheel in contact with the exciter rotor shaft during operation of the exciter in predetermined maximum overspeed conditions.

4. An exciter as defined in claim 3, wherein the predetermined maximum overspeed conditions are within a range of 15 to 25 percent above a rated operating speed for the exciter rotor shaft.

5. An exciter for starting a power generator, the exciter comprising:

an exciter rotor shaft having a positive stop member;

a diode wheel having a wheel hub and being mounted to the exciter rotor shaft by an interference fit; and a thermal insulation layer bonded to the exciter shaft and positioned between the shaft and the diode wheel in a location where electrical insulation is not necessary, wherein the thermal insulation layer has a minimum compressive yield strength, and wherein pressure from the diode wheel on the thermal insulation layer is below the minimum compressive yield strength of the thermal insulation layer and the interference fit is at least at a minimum interference to maintain the diode wheel in contact with the exciter rotor shaft during operation of the exciter in predetermined maximum overspeed conditions.

6. An exciter as defined in claim 5, wherein the predetermined maximum overspeed conditions are within a range of 15 to 25 percent above a rated operating speed for the exciter rotor shaft.

7. An exciter as defined in claim 5, wherein the thermal insulation layer includes a glass material and is able to withstand high compressive loads, and wherein the exciter rotor shaft and the wheel hub of the diode wheel are each formed of metal material.

\* \* \* \* \*